United States Patent [19]

Benton et al.

[11] 4,407,511

[45] Oct. 4, 1983

[54] SEAL AND SCRAPER ASSEMBLY

[75] Inventors: Robert L. Benton, Bay City; Dainis O. Martinsons; Flave F. Stimpson, both of Saginaw, all of Mich.

[73] Assignee: General Motors Corporation, Detroit, Mich.

[21] Appl. No.: 287,245

[22] Filed: Jul. 24, 1981

[51] Int. Cl.³ .................... E21B 33/08; F16J 15/00; F16J 15/16; F16K 41/00
[52] U.S. Cl. .................................. 277/24; 277/136; 277/165; 74/459
[58] Field of Search ............ 411/423, 900, 901, 907, 411/908; 74/424.8 R, 459; 277/24, 136, 152, 165, 167

[56] References Cited

U.S. PATENT DOCUMENTS

| | | | |
|---|---|---|---|
| 3,116,931 | 1/1964 | Edwards | 74/459 |
| 3,132,719 | 5/1964 | Cole | 74/459 X |
| 3,646,827 | 3/1972 | Patterson | 277/165 X |
| 3,669,460 | 6/1972 | Wysong | 277/24 |
| 4,052,076 | 10/1977 | Wysong | 277/24 |
| 4,053,167 | 10/1977 | Jelinek | 277/165 |
| 4,085,942 | 4/1978 | Yoshida et al. | 277/136 X |
| 4,226,431 | 10/1980 | Jelinek | 277/165 |

*Primary Examiner*—Wayne L. Shedd
*Attorney, Agent, or Firm*—Donald F. Scherer

[57] ABSTRACT

A seal and scraper assembly for a nut and screw actuator has an elastomeric member bonded to a metal ring. The elastomeric member has an annular lip outer portion and a helical thread form inner portion. The inner portion has a plurality of scraper or wiper surfaces interrupting the thread form at an oblique angle and cooperating with a lubricant return surface to direct lubricant, scraped from the screw thread surface, into the housing enclosing the nut and screw actuator. A web portion extends between the outer lip and the inner thread form along the same angle as each scraper surface so that a component of the assembly forces on the outer lip portion are transmitted to the scraper surface so as to increase the thread sealing and scraping forces. The metal ring has a contoured inner surface which is effective to chip ice and other foreign matter from the screw thread outboard of the elastomeric member and a pair of radially extending lugs which cooperate with recesses formed in the nut to prevent relative rotation between the nut and the seal and scraper assembly.

3 Claims, 7 Drawing Figures

SEAL AND SCRAPER ASSEMBLY

This invention relates to seals and more particularly to seal and scraper assemblies for use with nut and screw actuators.

Prior art seals for nut and screw actuators utilize a plurality of components which are assembled to provide the seal and scraper assembly. The scraper or wiper portion of the assembly is generally spring loaded into engagement with the screw thread form by a separable spring member. This spring member is sized to provide the desired force which the scraper will exert on the thread form.

The present invention provides a seal and scraper assembly wherein the sealing unit and scraper or wiper edge are formed in an integral elastomeric component which is bonded to a metal case member. The elastomeric member is formed to provide an outer sealing surface and an inner sealing surface in a manner such that during assembly the outer sealing surface is compressed and a portion of the forces of compression are transmitted to the scraper surface which is integral with the inner sealing surface. This force is transmitted through an integrally formed web member which may be controlled in size and direction to establish the amount of compressed forces that will be transmitted to the scraper surface.

It is therefore an object of this invention to provide an improved seal and scraper assembly wherein a portion of the forces imposed on an outer seal surface are transmitted to an inner scraper surface through a web member.

It is another object of this invention to provide an improved seal and scraper assembly having an outer annular seal and an inner thread form seal portion having an interrupted surface forming a plurality of scraper portions and wherein web members connect the outer annular seal to each scraper portion whereby a portion of the compression forces of assembly on the outer annular seal are transmitted to the scraper portions.

These and other objects and advantages of the present invention will be more apparent from the following description and drawings in which.

Figure 1:
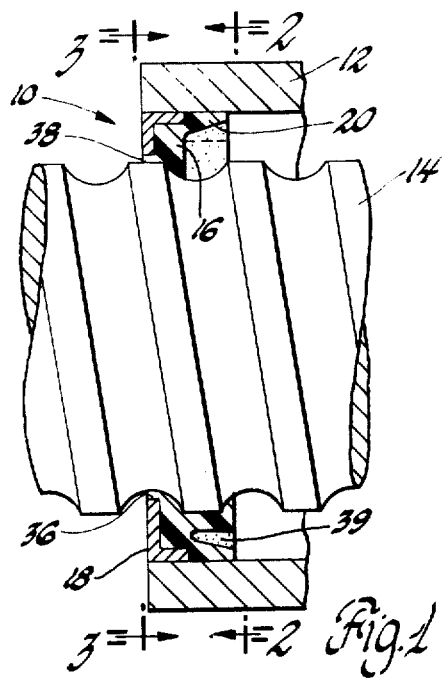
FIG. 1 is a cross-sectional elevational view of a seal member engaging a thread member.

Referring to the drawings, wherein like characters represent the same or corresponding parts throughout the several views, there is seen a seal and scraper assembly, generally designated 10, which is adapted to sealingly engage a conventional nut housing 12 in which is threadably supported a conventional actuator screw 14.

Figure 2:
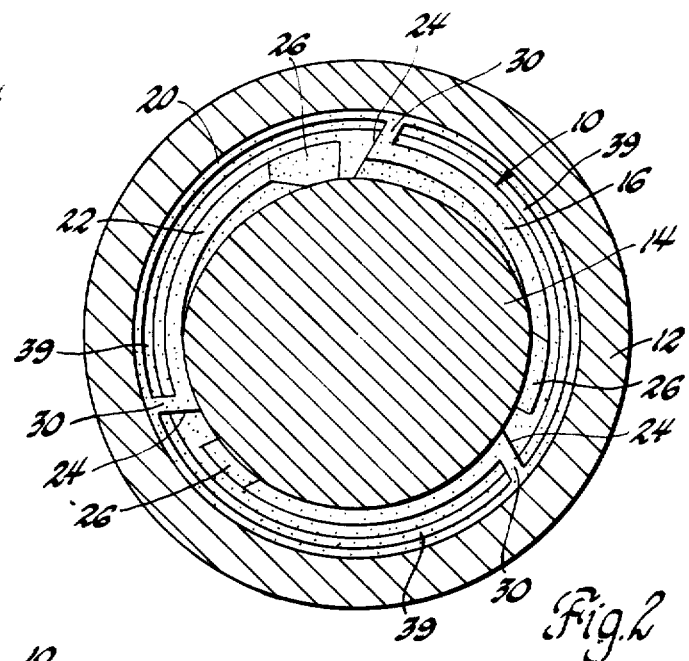
FIG. 2 is a cross-sectional view taken along line 2—2 of FIG. 1.
Figure 4:
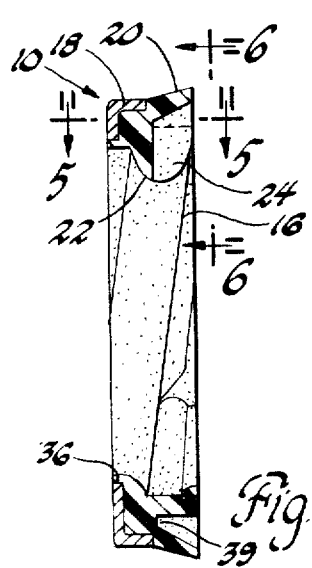
FIG. 4 is a cross-sectional elevational view of a seal and scraper assembly.
Figure 5:
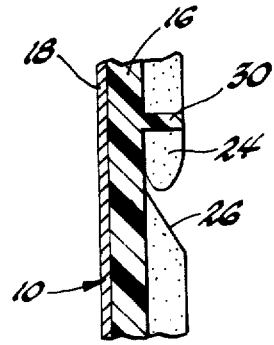
FIG. 5 is a sectional view taken along line 5—5 of FIG. 4.

As best seen in FIGS. 4 and 5, the assembly 10 has an elastomeric portion 16 which is bonded to a metal ring 18. The elastomeric portion 16 has an outer annular lip type seal portion 20 and an inner thread form seal portion 22. The thread form seal portion 22 is interrupted by a plurality of scraper or wiper surfaces 24 which, as best seen in FIG. 2, intersect the radial direction of the screw 14 at an angle oblique thereto.

Figure 6:
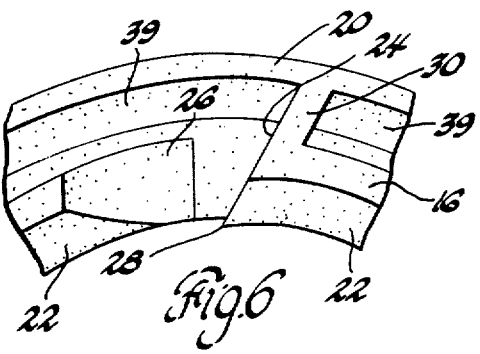
FIG. 6 is a view taken along line 6—6 of FIG. 4.
Figure 7:
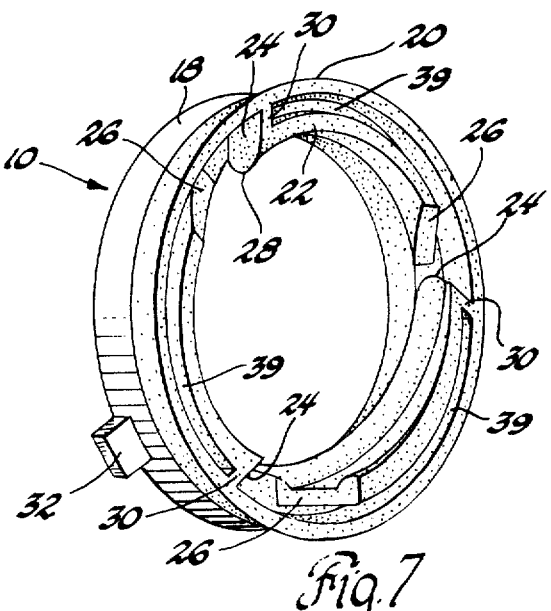
FIG. 7 is a perspective view of a seal and scraper assembly.

Circumferentially spaced from each scraper surface 24 is a lubricant return surface 26 which is operable to direct lubricant, such as grease, axially inward relative to the nut housing 12. As best seen in FIGS. 6 and 7, the scraper surface 24 has a leading edge 28 which, in its free state, extends radially inward from the thread form seal portion 22. It should also be noted in FIGS. 6 and 7 that each scraper surface 24 is connected to the annular seal portion 20 by a respective web member 30 which extends along the same angular attitude as the scraper surface 24.

The inner thread form seal 22 is dimensioned to seal along the thread form of screw 14. The thread form 22 has at least two helical starts so that the interruptions created by scraper surface 24 and return surface 26 do not provide open flow passages through which lubricant can escape.

It will be noted in FIG. 1 that the seal assembly 10 slidably engages the inner surface of nut housing 12 such that the annular lip 20 is forced radially inward during assembly. The radially inward movement of annular seal 20 results in sealing forces between the annular seal 20 and housing 12. A portion of these forces are transmitted through the web members 30 to the leading edge 28 of the respective scraper surfaces 24.

As pointed out above, the leading edge 28 of scraper surface 24 in its free shape is radially inward of the thread form 22. Therefore, when the seal assembly 10 is engaged by the screw thread 14, the leading edge 28 is forced radially outward to assume the thread form shape such that scraper or wiper forces are established. These forces are additive to the forces transmitted through web 30 such that sufficiently high wiping forces can be generated without the use of excessively high deflections at the leading edge 28.

The amount of force transmitted through web 30 is controlled by its physical dimension while the direction of the force is controlled by angular attitudes, therefore, it will be appreciated that this force can be varied in direction from purely radial to substantially tangential.

Figure 3:
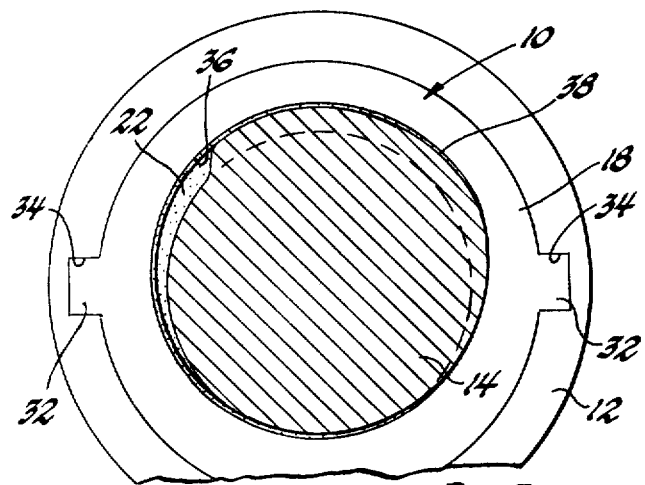
FIG. 3 is a cross-sectional view taken along line 3—3 of FIG. 1.

The metal ring 18, as best seen in FIGS. 3 and 7, has a pair of radially extending lugs 32 which engage rectangular slots 34 formed in the nut housing 12. These members cooperate to prevent rotation of the seal assembly 10 relative to the nut housing 12.

The annular lip 20 on the outer diameter of the seals 10 is designed to seal grease in the nut 12 without the use of extra sealant around the outer diameter as is necessary with current seals. This lip 20 has grooves 39 formed below the lip 20 to allow the seal to center itself on the screw 14 and still seal around the outer diameter. The screw 14 determines where the seal will be located radially and the lip 20 has enough flexibility to seal with a standard amount of out of concentricity condition between the counterbore of nut 12 and the thread of screw 14.

The seal scraper 10 is allowed to move axially in the nut 12 to allow for axial lash between the nut 12 and screw 14. This feature is obtained by allowing the seal 10 to move axially in slot 34 provided in the nut 12 for antirotation tang 32. In other words the seal 10 will move axially with the screw 14 for lash allowance and the lip 20 will slide axially on the inner surface of nut 12. The most significant feature here is that the elastomeric portion 16 in the grooves need not compress to allow for axial lash. Therefore, wear failure will be greatly minimized.

The metal ring 18 has an inner contour 36 which closely approximates the thread form with which the seal assembly 10 is utilized. Therefore, during operation, the surface 36 is in very close special relationship with the outer surface 38 of the thread 14. Any foreign matter such as ice which might collect on the screw thread 14 outboard of the nut housing 12 will be removed therefrom when the surface 38 of screw 14 moves past the contoured surface 36. This will prevent solid foreign material from hardening to the thread form and being transmitted past the seal assembly.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A seal and scraper for a nut and screw actuator comprising; an annular lip member abutting and compressed radially inward by a cylindrical surface on said nut at assembly; a thread sealing portion having a thread form cooperating with the screw thread on the actuator and including a plurality of circumferentially spaced scraper means each defined by a scraper surface extending through the thread form at an angle oblique to a radius of the thread form and terminating at a position radially inward of a normal thread form when the screw actuator is not engaging the screw thread so that the thread sealing portion adjacent the scraper surface must be deflected radially outward during insertion of the screw actuator, web means connecting the lip member with the thread sealing portion along the oblique angle for transfering the force of compression on said lip member to the scraper surface of said thread sealing portion and a lubricant return surface extending in a circumferential direction oblique to the axial direction of the thread form; and means for preventing rotation of said seal and scraper relative to the nut.

2. A seal and scraper for a nut and screw actuator comprising; an annular lip member abutting and compressed radially inward by a cylindrical surface on said nut at assembly; a thread sealing portion having a thread form cooperating with the screw thread on the actuator and including a plurality of circumferentially spaced scraper means each defined by a scraper surface extending through the thread form at an angle oblique to a radius of the thread form and terminating at a position radially inward of a normal thread form when the screw actuator is not engaging the screw thread so that the thread sealing portion adjacent the scraper surface must be deflected radially outward during insertion of the screw actuator, web means connecting the lip member with the thread sealing portion along the oblique angle for transferring the force of compression on said lip member to the scraper surface of said thread sealing portion, a lubricant return surface extending in a circumferential direction oblique to the axial direction of the thread form; and means for preventing rotation of said seal and scraper relative to the nut; and a metal ring member having a contour disposed in close proximity to the thread of the screw to remove foreign matter from the thread as the screw translates inboard of the metal ring.

3. A seal and scraper for a nut and screw actuator comprising; a metal ring having a contoured surface in close proximity with the screw; an elastomeric seal member bonded to said metal ring including an annular lip portion, and a thread sealing portion; said annular lip portion abutting and compressed radially inward by a cylindrical surface on said nut at assembly; said thread sealing portion having a thread form cooperating with the screw thread on the actuator and including a plurality of circumferentially spaced scraper means each defined by a scraper surface extending through the thread form at an angle oblique to a radius of the thread form and terminating at a position radially inward of a normal thread form when the screw actuator is not engaging the screw thead so that the thread sealing portion adjacent the scraper surface must be deflected radially outward during insertion of the screw actuator, web means connecting the lip member with the thread sealing portion along the oblique angle for transferring the force of compression on said lip member to the scraper surface of said thread sealing portion and a lubricant return surface extending in a circumferential direction oblique to the axial direction of the thread form; and means for preventing rotation of said seal and scraper relative to the nut; and said metal ring member having means engaging the nut for preventing rotation of said seal and scraper relative to the nut.

* * * * *